United States Patent
Greene

[11] 3,897,752
[45] Aug. 5, 1975

[54] BROODER DEVICE

[76] Inventor: Jack E. Greene, P. O. Box 2591, Little Rock, Ark. 72203

[22] Filed: Aug. 23, 1971

[21] Appl. No.: 173,958

[52] U.S. Cl. .................................................. 119/33
[51] Int. Cl. ............................................. A01k 31/20
[58] Field of Search .......... 119/32, 31, 33; 219/347, 219/20, 544, 45

[56] References Cited
UNITED STATES PATENTS

| 1,667,857 | 5/1928 | Harpster et al. ............. 219/544 X |
| 2,610,285 | 9/1952 | Rusnak et al. ................ 119/31 X |
| 2,748,247 | 5/1956 | Kozbelt ............................ 219/347 |
| 2,909,152 | 10/1959 | Cordis ............................ 119/33 X |
| 3,062,941 | 11/1962 | White ............................ 219/20 |

Primary Examiner—Aldrich F. Medbery
Attorney, Agent, or Firm—Watson, Cole, Grindle & Watson

[57] ABSTRACT

A brooder device including a conical hover and an infrared coiled heating element mounted thereon, said hover having a central top opening therein and a thermostatic device mounted on said hover for insuring a relatively constant predetermined temperature below said hover by both radiation and convection from said heating element.

2 Claims, 4 Drawing Figures

PATENTED AUG 5 1975  3,897,752
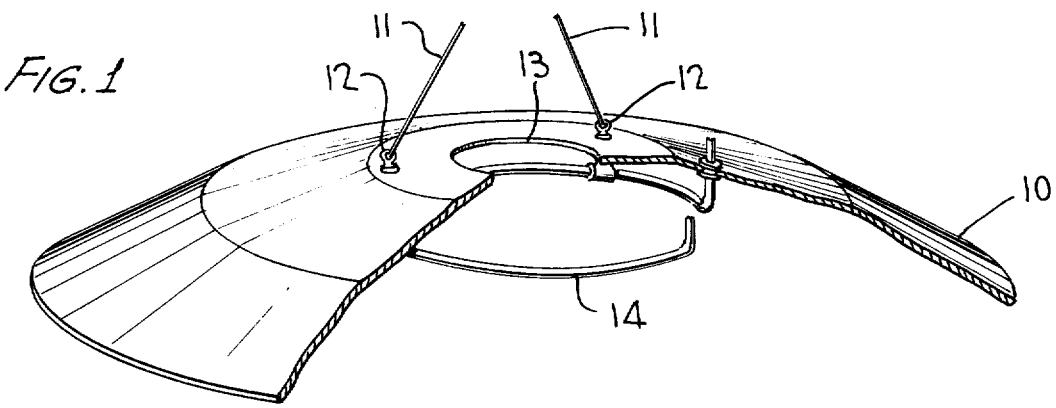
FIG. 1
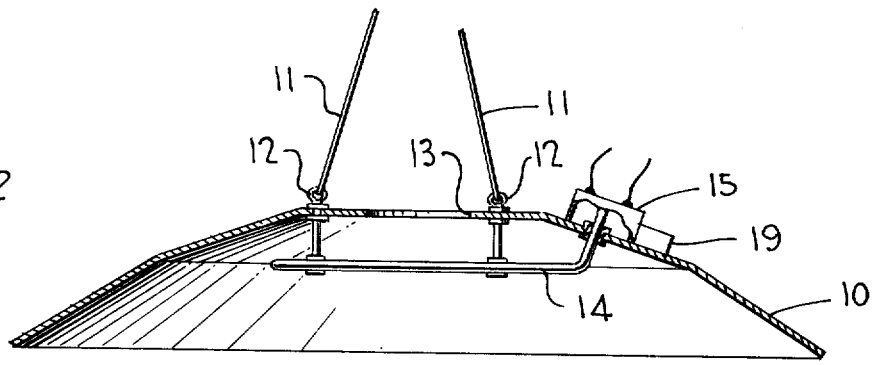
FIG. 2
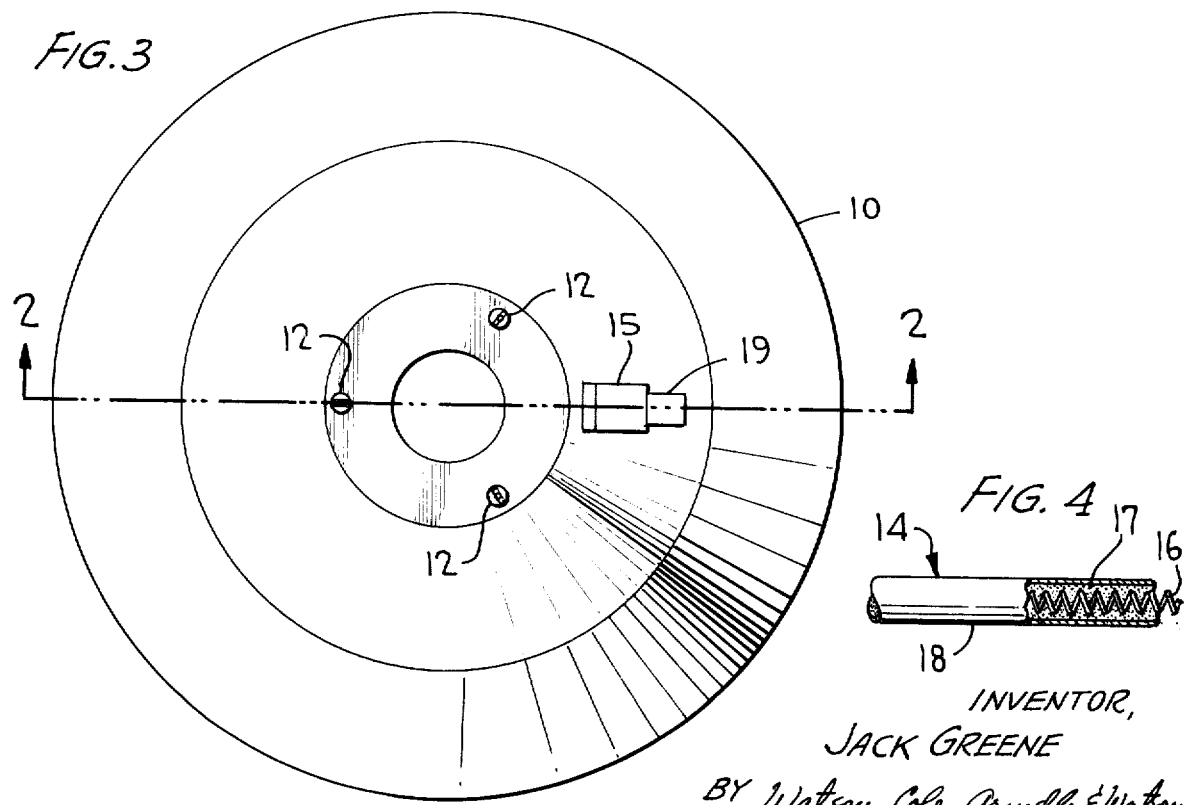
FIG. 3
FIG. 4
INVENTOR,
JACK GREENE
BY Watson, Cole, Grindle & Watson
ATTORNEYS

BROODER DEVICE

This invention relates generally to a brooder device for animals and more particularly to a brooder device having a thermostatically controlled infrared heating element mounted beneath a hover, the device being designed in a manner to more effectively and more economically maintain a predetermined temperature for the animals.

It is well known that infrared heating devices have been used in brooder devices and in other animal enclosures for the purpose of heating animals such as baby chicks and other poultry. Such infrared units normally comprise either the standard electrically powered lamps or the gas-operated infrared generators. A comfortable environment for the chicks may therefore be obtained by warming the animal directly with the infrared rays rather than warming the surrounding air to provide the desired ambient temperature for the animals. Control devices for such systems normally comprise those which primarily respond to the air temperature. Alternatively, control devices of a rather intricate nature have also been devised which take into account the ambient temperature, the heat received from the infrared emitter, and the heat loss by convection.

A principal object of the present invention is to provide a brooder device which uses infrared heating but which operates with a standard control device and conducts heat by both radiation and convection to thereby maintain low operating and installation costs and to more effectively and efficiently warm the animals.

Another object of this invention is to provide such a brooder wherein the heating element is controlled by means of a standard bi-metallic thermostat and the heating element comprises a ring-shaped metallic tubular sheath filled with magnesium oxide surrounding an elongated resistance wire coil whereby the animals beneath the hover are heated by both radiation and convection from the heating element.

A further object of this invention is to provide such a brooder wherein a conical hover is used, such hover having a central opening at its top portion and being of aluminum so as to reflect a high degree of the infrared energy from the heating element to the required area below the hover.

Other objects, advantages and novel features of the invention will become apparent from the following detailed description of the invention when considered in conjunction with the accompanying drawings wherein:

FIG. 1 is a perspective view, partly in section, of the hover and heating element assembled in accordance with the present invention;

FIG. 2 is a sectional view of the device taken substantially along the line 2—2 of FIG. 3;

FIG. 3 is a top view of the device of FIG. 2, and

FIG. 4 is a detailed view, partly in section, showing the details of the heating element used for the device.

Turning now to the drawings wherein like reference characters refer to like and corresponding parts throughout several views, there is shown a hover element 10, substantially conical or dome-shaped, which may be made from a spun 0.029-inch thick aluminum sheet. Aluminum is used because it has a very high infrared energy reflection of approximately 80 percent and a high specific heat of approximately 0.21. Also, its lightness and strength properties permit it to be easily mounted by means of chains such as 11 with the simple use of eyebolts 12. Moreover, the chain mounting facilitates easy relocation of the hover and permits it to be adjusted in height from the floor during growth of the animals without extensive and time-consuming rearrangement of the mounting system.

The hover is conical or dome-shaped to direct the maximum amount of radiant heat energy to the required area below the hover. It also has an opening 13 at its central top portion which is sized to correspond with the electrical size of the heat source.

A heating element 14 is mounted by means of bolts 12 in any normal manner so that its free ends may extend through the aluminum hover and into a wiring box 15 mounted on the outside surface of the hover, as shown clearly in FIG. 2. The heating element 14 is substantially ring-shaped and comprises a high-electric-resistance wire coil 16 (see FIG. 4) encased in a quantity of magnesium oxide 17 and enclosed by a tube of sheathing which may be of incoloy steel. As electric current passes through the wire coil, heat is generated and transferred by the magnesium oxide to the outside metal sheath 18. Accordingly, the metal sheath becomes a radiant heat source.

The metal sheath of the element operates in the temperature range of 1000°F to 1400°F, which is lower than the temperature range of infrared lamps and tube heat sources. Due to such a low element temperature, the heating element has a radiant heat wave length of about 2.6 microns. Moreover, due to the operating temperature range, the distribution of relative energy will be about half radiation and about half convection. The combination of radiant and convection heating and the inherent long energy wave length make possible a more uniform heating beneath the hover, resulting in a more desirable environment for the chicks.

The metal sheathing of the heating element has the highest capacity to withstand thermal and mechanical shock of any infrared heat source and therefore provides a heating unit capable of long life. The relative response to heat-up and cold-down is slow compared to other infrared heat sources so that a sudden change in the animals' environment is not likely to occur.

The heating element is mounted on the canopy or hover by means of stainless steel bolts 12 and is so positioned as to direct the reflected infrared energy into the needed areas. Convection heating is also permitted with such an arrangement since there is no heat shield between the animals and the heat source.

A temperature control device 19 is operatively mounted to the wiring box 15 on the outside surface of the hover, as seen in FIG. 2. Such a temperature control device is of the standard bi-metallic, snap-action type operating on the principle that two dissimilar metals will contract and expand to different degrees when heated in the same manner.

The thermostatic device 19, with the aid of the opening 13 in the hover, is capable of effectively controlling the heat source in relation to the temperature maintained in the required area below the hover. With the thermostat mounted as shown in FIG. 2, it will cycle the heat source sufficiently to maintain a very comfortable environment for the animals so that sudden changes in light and heat energy will not be experienced.

Although the invention has been described specifically with respect to a chicken brooder, it should be understood that it could also be used with other infrared-heated animal enclosures, and may have other possible applications to greenhouse operations, for example.

Obviously, many modifications and variations of the present invention are possible in the light of the above teachings. It is therefore to be understood that within the scope of the appended claims, the invention may be practiced otherwise than as specifically described.

What is claimed is:

1. A brooder device comprising, a conical hover, a metal sheath ring-shaped infrared heating element mounted to said hover at the top inner surface thereof for heating-up said hover so as to effect heat by radiation thereof, elongated bolt means spacing said heating element from said hover, elongated suspension means interconnected at one end thereof with said bolt means for suspending the device from a support, a thermostatic control device operatively interconnected with said heating element and being mounted on said hover for controlling the temperature of said heating element depending on the temperature of said hover and the air surrounded by said hover, and the major portion of the top of said hover inwardly of said bolt means having a central opening therein for admitting air to circulate therethrough within said hover which, when heated up by said heating element, produces heat by convection.

2. The device according to claim 1 wherein said thermostatic device comprises a bi-metallic thermostatic control element.

* * * * *